(12) United States Patent
Pon et al.

(10) Patent No.: US 12,330,213 B2
(45) Date of Patent: Jun. 17, 2025

(54) THREE-DIMENSIONAL PRINTING WITH SUPPORTIVE COATING AGENTS

(71) Applicant: PERIDOT PRINT LLC, Palo Alto, CA (US)

(72) Inventors: Ben Pon, Palo Alto, CA (US); John Samuel Dilip Jangam, Palo Alto, CA (US); Kyle Wycoff, Palo Alto, CA (US); Lihua Zhao, Palo Alto, CA (US)

(73) Assignee: Peridot Print, LLC, Palo Alto, CA (US)

( * ) Notice: Subject to any disclaimer, the term of this patent is extended or adjusted under 35 U.S.C. 154(b) by 368 days.

(21) Appl. No.: 17/641,253

(22) PCT Filed: Nov. 8, 2019

(86) PCT No.: PCT/US2019/060517
§ 371 (c)(1),
(2) Date: Mar. 8, 2022

(87) PCT Pub. No.: WO2021/091572
PCT Pub. Date: May 14, 2021

(65) Prior Publication Data
US 2022/0331865 A1 Oct. 20, 2022

(51) Int. Cl.
*B22F 10/14* (2021.01)
*B22F 1/052* (2022.01)
(Continued)

(52) U.S. Cl.
CPC .............. *B22F 10/14* (2021.01); *B22F 1/107* (2022.01); *B33Y 10/00* (2014.12); *B33Y 70/10* (2020.01); *B22F 2301/205* (2013.01); *B22F 2302/45* (2013.01); *B22F 2304/10* (2013.01); *B33Y 30/00* (2014.12)

(58) Field of Classification Search
None
See application file for complete search history.

(56) References Cited

U.S. PATENT DOCUMENTS 4,793,968 A 12/1988 Mosser et al.
5,409,660 A 4/1995 Alpha et al.
(Continued)

FOREIGN PATENT DOCUMENTS

CN 109195776 A 1/2019
EP 2001656 A2 12/2008
(Continued)

OTHER PUBLICATIONS

Wikipedia_Zirconium_Tungstate.*

*Primary Examiner* — Jenny R Wu
(74) *Attorney, Agent, or Firm* — Dierker & Kavanaugh, P.C.

(57) ABSTRACT

A three-dimensional printing kit can include a particulate build material, a binding agent, and a supportive coating agent. The particulate build material can include from about 80 wt % to about 100 wt % metal particles based on the total weight of the particulate build material. The binding agent can include binder particles dispersed in a binder liquid vehicle. The supportive coating agent can include ceramic particles having a negative coefficient of thermal expansion, a gelling compound, and a supportive coating liquid vehicle.

15 Claims, 3 Drawing Sheets

(51) Int. Cl.
    *B22F 1/107*     (2022.01)
    *B22F 1/16*     (2022.01)
    *B33Y 10/00*     (2015.01)
    *B33Y 70/10*     (2020.01)
    *B33Y 30/00*     (2015.01)

(56) References Cited

U.S. PATENT DOCUMENTS

| | | | |
|---|---|---|---|
| 5,749,041 | A | 5/1998 | Lakshminarayan et al. |
| 6,814,926 | B2 | 11/2004 | Geving et al. |
| 8,454,885 | B2 | 6/2013 | Dawes et al. |
| 2010/0028645 | A1 | 2/2010 | Maguire et al. |
| 2017/0297098 | A1 | 10/2017 | Myerberg et al. |
| 2018/0261363 | A1* | 9/2018 | Lee ................. B22F 10/16 |
| 2019/0111479 | A1* | 4/2019 | Kasperchik ........... B22F 10/16 |
| 2019/0270254 | A1 | 9/2019 | Mark et al. |
| 2021/0238099 | A1* | 8/2021 | Canales ............ C04B 35/62277 |

FOREIGN PATENT DOCUMENTS

| | | | |
|---|---|---|---|
| EP | 3226977 A2 | 10/2017 | |
| EP | 3911461 A1 | 11/2021 | |
| WO | 2016/090359 A2 | 6/2016 | |
| WO | WO-2017181054 A1 * | 10/2017 | ............... B22F 1/10 |
| WO | WO-2018156933 A1 * | 8/2018 | ........... B22F 1/0011 |
| WO | 2020/190274 A1 | 9/2020 | |

* cited by examiner

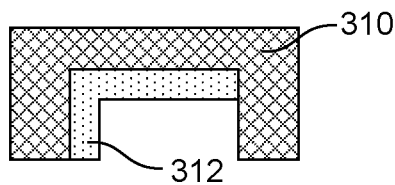
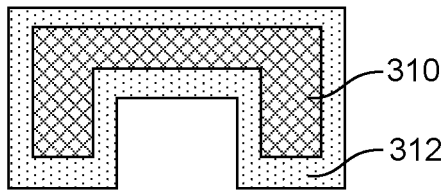
FIG. 3A    FIG. 3B
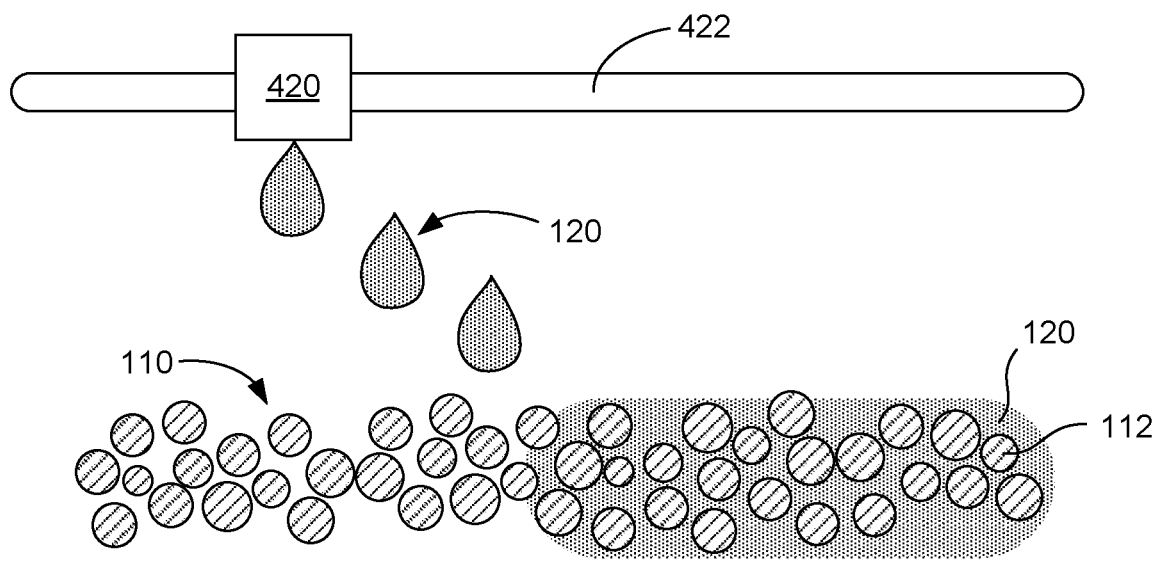
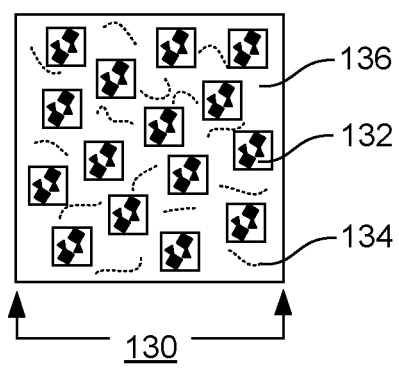
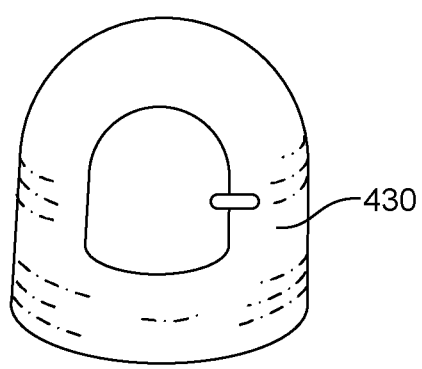
FIG. 4

THREE-DIMENSIONAL PRINTING WITH SUPPORTIVE COATING AGENTS

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques are considered additive processes because they involve the application of successive layers of material. This is unlike other machining processes, which often rely upon the removal of material to create the final part. Some three-dimensional printing methods use chemical binders or adhesives to bind build materials together. Other three-dimensional printing methods involve partial sintering, melting, etc. of the build material. For some materials, partial melting may be accomplished using heat-assisted extrusion, and for some other materials curing or fusing may be accomplished using, for example, ultra-violet light or infrared light.

BRIEF DESCRIPTION OF THE DRAWINGS

FIG. 3A graphically illustrates an example green body object with a supportive coating agent applied thereto in accordance with the present disclosure;

FIG. 3B graphically illustrates an example green body object with a supportive coating agent applied thereto in accordance with the present disclosure; and FIG. 4 graphically illustrates an example three-dimensional printing system in accordance with the present disclosure.

DETAILED DESCRIPTION

Figure 1:
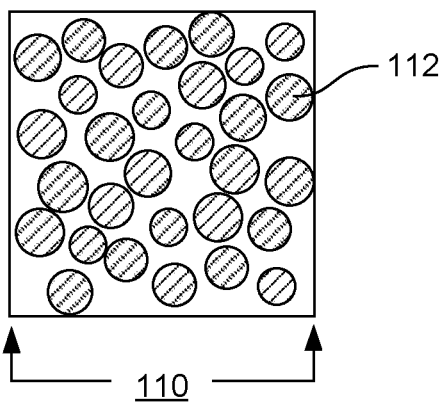
FIG. 1 graphically illustrates an example three-dimensional printing kit in accordance with the present disclosure.
Figure 1:
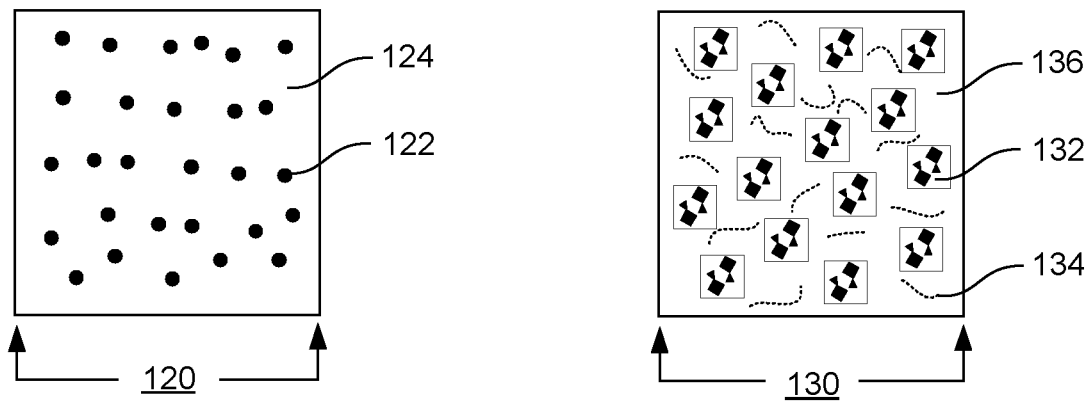

Three-dimensional printing can be an additive process involving the application of successive layers of a particulate build material with binding agent printed thereon to bind the successive layers of the particulate build material together. In some processes, application of a binding agent with a binder therein can be utilized to form a green body object or article and then a heat-fused three-dimensional object can be formed therefrom, such as by sintering, annealing, melting, etc. More specifically, a binding agent can be selectively applied to a layer of a particulate build material on a support bed, e.g., a build platform supporting particulate build material, to pattern a selected region of a layer of the particulate build material and then another layer of the particulate build material can be applied thereon. The binding agent can be applied again, and then repeated to form the green part (also known as a green body object or a green body article), which can then be heat-fused to form the heat-fused three-dimensional object. In three-dimensional printing with metal particles the binding agent may burn off before individual metal particles fuse to one another. As a result, the green body object can deform by bending, warping, curling, or sagging during heat-fusing of the particulate build material. Three-dimensional printed articles may be subject to greater deformation in areas where gravitational and/or mechanical forces act on the green body object such as at unsupported or overhanging regions.

In accordance with this, a three-dimensional printing kit can include a particulate build material, a binding agent, and a supportive coating agent. The particulate build material can include from about 80 wt % to about 100 wt % metal particles based on the total weight of the particulate build material. The binding agent can include binder particles dispersed in a binder liquid vehicle. The supportive coating agent can include ceramic particles having a negative coefficient of thermal expansion, a gelling compound, and a supportive coating liquid vehicle, e.g., water, alcohol, combination of water and alcohol, etc. In an example, the metal particles can be selected from aluminum, titanium, copper, cobalt, chromium, nickel, vanadium, tungsten, tungsten carbide, tantalum, molybdenum, magnesium, gold, silver, stainless steel, steel, an alloy thereof, or an admixture thereof. In another example, the metal particles can have a D50 particle size distribution value of from about 2 µm to about 150 µm. In yet another example, the ceramic particles can be selected from zirconium tungstate, titanium carbide, silicon nitride, silicon carbide, boron nitride, kaolin silicate, eucryptite ($LiAlSiO_4$), cordierite ($Mg_2Al_4Si_5O_{18}$), cyanide, cadmium cyanamide ($Cd(CN)_2$), or a combination thereof. In a further example, the gelling compound can be an inorganic gelling compound selected from sodium metasilicate, potassium metasilicate, sodium orthosilicate, sodium pyrosilicate, organo orthoosilicate, tetraethyl orthosilicate, or a combination thereof. In one example, a weight ratio of the ceramic particles to the gelling compound can range from about 1:1 to about 1:9. In another example, the ceramic particles can include zirconium tungstate and the gelling compound can include sodium metasilicate. The zirconium tungstate can be in the form of particles dispersed in a gel formed from the sodium metasilicate and the supportive coating liquid vehicle.

A method of three-dimensional printing can include iteratively applying individual build material layers of a particulate build material which can include from about 80 wt % to about 100 wt % metal particles based on the total weight of the particulate build material; based on a three-dimensional object model, iteratively applying a binding agent to individual build material layers which can define individually patterned object layers that can become adhered to one another to form a green body object; coating the green body object with a supportive coating agent, the supportive coating agent can include ceramic particles having a negative coefficient of thermal expansion, a gelling compound, and a supportive coating liquid vehicle; heating the green body object to a coating-hardening temperature to harden the supportive coating agent thereon and form a supportive coating on the green body object; and heating the green body object to a metal particle-fusing temperature that can be higher than the coating-hardening temperature to form a heat-fused three-dimensional object. In an example, the method can further include removing the supportive coating from the heat-fused three-dimensional object. In another example, the removing of the supportive coating can include sand-blasting, water-blasting, dry-ice blasting, ice-blasting, vacuuming, ultra-sonicating, brushing, or a combination thereof. In one example, the method can further include preparing the supportive coating agent by dispersing the ceramic particles in a gel of the supportive coating liquid vehicle and the gelling compound. In another example, the coating of the green body object can include applying the coating at a thickness ranging from about 0.2 mm to about 2 mm. In a further example, the heating of the green body object to the first temperature to harden the supportive coating agent can be at a temperature from about 100° C. to about 200° C.; and heating the green body object to a second temperature higher than the first temperature, can be at a temperature from about 10° C. to about 1,050° C. below a melting temperature of the metal particles of the particulate build material for a time period from about a half hour to about twenty-four hours.

In another example, a three-dimensional printing system can include a particulate build material, a binding agent applicator, a binding agent, a supportive coating agent, and a heat source. The particulate build material can include from about 80 wt % to about 100 wt % metal particles based on the total weight of the particulate build material. The binding agent applicator can be fluidly coupled or coupleable to the binding agent to iteratively apply the binding agent to the particulate build material to form individually patterned object layers of a green body object. The supportive coating agent can include ceramic particles having a negative coefficient of thermal expansion, a gelling compound, and a supportive coating liquid vehicle to apply to the green body object. The heat source can be operable to heat the green body object with the supportive coating agent thereon to a coating-hardening temperature to harden the supportive coating agent and form a supportive coating on the green body object. In another example, the system can further include a sintering oven to receive and heat the green body object with the supportive coating thereon to a metal particle-fusing temperature to form a heat-fused three-dimensional object; or the heat source can be a sintering oven to heat the green body object with the supportive coating thereon to a metal particle-fusing temperature that can be higher than the coating-hardening temperature to thereby heat the green body object sufficient to form a heat-fused three-dimensional object.

When discussing the three-dimensional printing kit, the method of three-dimensional printing, and/or the three-dimensional printing system herein, these discussions can be considered applicable to one another whether or not they are explicitly discussed in the context of that example. Thus, for example, when discussing a supportive coating agent related to a three-dimensional printing kit, such disclosure is also relevant to and directly supported in the context of the method of three-dimensional printing, the three-dimensional printing system, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

In accordance with examples of the present disclosure, a three-dimensional (3D) printing kit 100 is shown in FIG. 1. The three-dimensional printing kit can include a particulate build material 110, a binding agent 120, and a supportive coating agent 130. The particulate build material can include from about 80 wt % to about 100 wt % metal particles 112 based on the total weight of the particulate build material. The binding agent can include binder particles 122 dispersed in a binder liquid vehicle 124. The supportive coating agent can include ceramic particles 132 having a negative coefficient of thermal expansion, e.g., metal oxide ceramic particles, non-oxide ceramic particles, etc., along with a gelling compound 134, and a supportive coating liquid vehicle 136, which can include water, alcohol, or a combination thereof. The particulate build material may be packaged or co-packaged with the binding agent and/or the supportive coating agent in separate containers, and/or can be combined with one another at the time of printing, e.g., loaded together in a three-dimensional printing system.

The term "ceramic particles" as used herein refers to inorganic crystalline particles of oxides, nitrides, tungstates, silicates, eucryptites, codierites, cyanides, cyanamides, carbides, titanates, aluminates, or the like, which are in the form of crystalline particles. Ceramics can include metal oxide ceramics or can include nonmetal-ceramics. Examples include zirconium tungstate, titanium carbide, silicon nitride, silicon carbide, boron nitride, kaolin silicate, eucryptite, cordierite, cyanide, calcium cyanamide, or a combination thereof.

Methods of Three-Dimensional Printing

Figure 2:
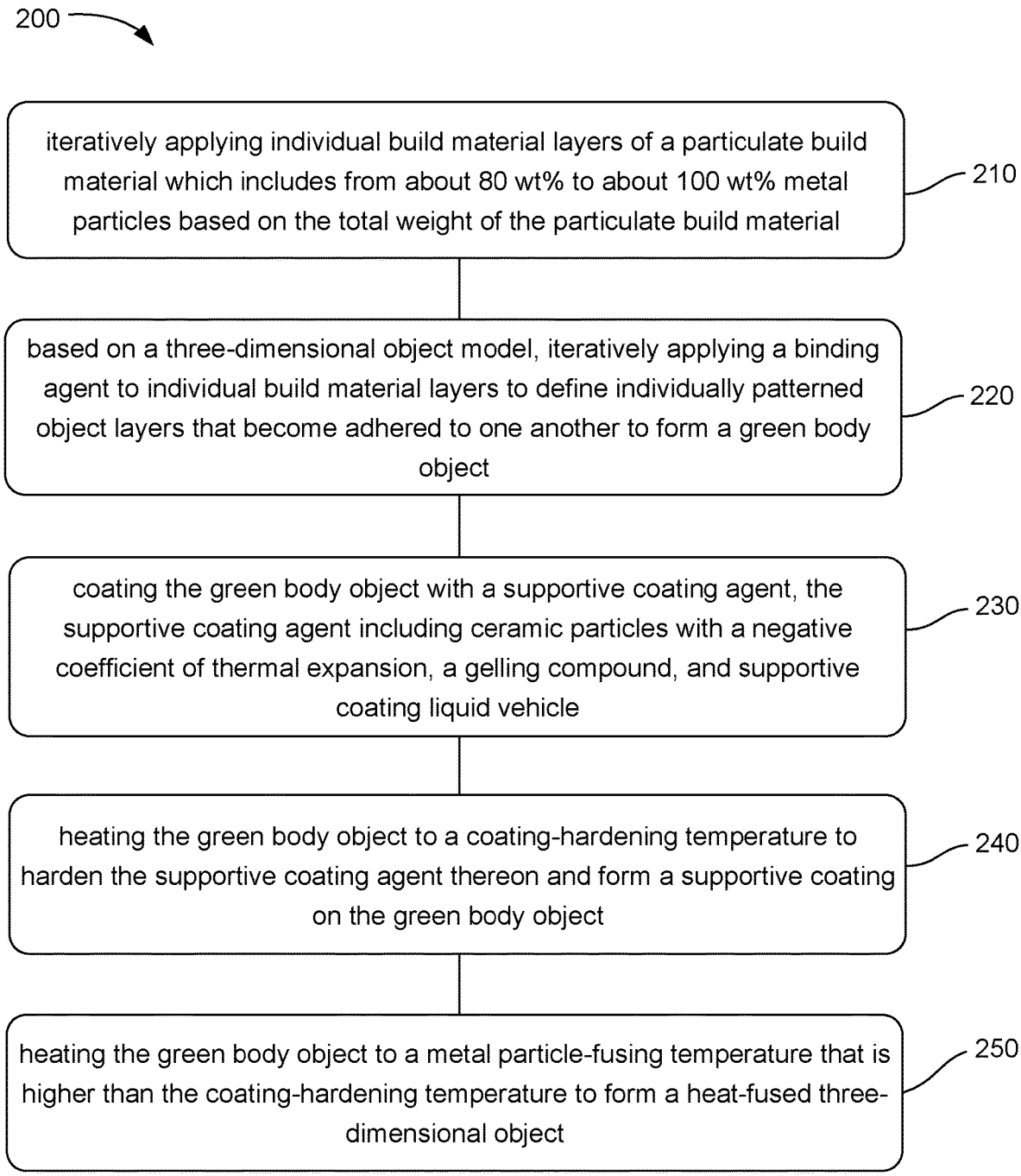
FIG. 2 is a flow diagram illustrating an example method of three-dimensional printing in accordance with the present disclosure.

A flow diagram of an example method 200 of three-dimensional (3D) printing is shown in FIG. 2. The method can include iteratively applying 210 individual build material layers of a particulate build material which can include from about 80 wt % to about 100 wt % metal particles based on the total weight of the particulate build material; and based on a three-dimensional object model, iteratively applying 220 a binding agent to individual build material layers to define individually patterned object layers that can become adhered to one another to form a green body object. The method further can include coating 230 the green body object with a supportive coating agent, the supportive coating agent can include ceramic particles having a negative coefficient of thermal expansion, a gelling compound, and a supportive coating liquid vehicle; heating 240 the green body object to a coating-hardening temperature to harden the supportive coating agent thereon and form a supportive coating on the green body object; and heating 250 the green body object to a metal particle-fusing temperature that can be higher than the coating-hardening temperature to form a heat-fused three-dimensional object.

In printing in a layer-by-layer manner, the particulate build material can be spread, the binding agent applied, and then the build platform can then be dropped a distance of (x), which in one example can be from about 5 μm to about 1 mm, which can correspond to the thickness of a printed layer of the green body object, so that another layer of the particulate build material can be added again thereon to receive another application of binding agent, and so forth. This process can be repeated on a layer by layer basis until the entire green body object is formed. A "green" body object (or individual layer) can refer to any component or mixture of components that are not yet sintered or annealed, but which are held together in a manner sufficient to permit heat-fusing, e.g., handling, moving, or otherwise preparing the part for subsequent coating with the supportive coating agent and heat-fusing. During the build, in one example, heat can be applied from overhead and/or can be provided by the build platform from beneath the particulate build material to drive off water and/or other liquid components, as well as to further solidify the layer of the green body object. In other examples, the particulate build material can be heated prior to dispensing.

Following formation of the green body object, the supportive coating agent 312 can be applied as a partial coating along select regions of the green body object 310 that may have been otherwise unsupported during heat fusing, as shown in FIG. 3A. In yet another example, the supportive coating agent 312 can be applied as a coating around a portion of exterior surfaces of the green body object 310, as illustrated in FIG. 3B. In a further example, the supportive coating agent can be applied as a full coating on all exterior surfaces of the green body object. Coating the supportive coating agent on the green body object can include any application process. For example, the application can include dip coating, spray coating, brush coating, extrusion, or the like. The supportive coating agent can be applied on a surface of a green body object at a thickness ranging from about 0.2 mm to about 2 mm, from about 0.75 mm to about 1.75 mm, from about 1 mm to about 2, or from about 0.5 mm to about 1.5 mm.

Following coating the green body object with the supportive coating agent thereon, the entire green body object with the supportive coating agent thereon can be moved to a heat source. The heat source is not limited and can include, for example, an oven (which may be the same oven used to subsequently sinter the green body object), a hot plate, a gas incubator, an infrared radiation source, an electromagnetic radiation source, an electron beam source, or the like. The heat source can be used to heat the green body object with the supportive coating agent thereon to a coat-hardening temperature to harden the supportive coating agent. The coat-hardening temperature can vary depending on the supportive coating agent. In some examples, the coat-hardening temperature can range from about 75° C. to about 300° C., from about 100° C. to about 200° C., from about 125° C. to about 175° C., or from about 100° C. to about 120° C.

The green body object with the hardened supportive coating agent can then be further heated to a temperature that can be higher than the coating-hardening temperature to form a heat-fused three-dimensional object. The heat source is not limited and can include any of the heat sources identified above. The heat source can be the same heat source or can be a different heat source from the heat source used to harden the supportive coating agent. In an example, the green body object can be heat-fused by sintering and/or annealing. The term "sinter" or "sintering" refers to the consolidation and physical bonding of the metal particles together (after temporary binding using the binding agent) by solid state diffusion bonding, partial melting of metal particles, or a combination of solid state diffusion bonding and partial melting. The term "anneal" or "annealing" refers to a heating and cooling sequence that controls the heating process and the cooling process, e.g., slow cooling in some instances can remove internal stresses and/or toughen the heat-fused three-dimensional object.

A temperature at which particles of the particulate build material fuse to one another may vary depending on the metal particles of the particulate build material. In one example, the heat-fusing temperature can range from about 10° C. below the melting temperature of the metal particles of the particulate build material to about 1,500° C. below the melting temperature of the metal particles of the particulate build material. In another example, a heat-fusing temperature can range from about 400° C. below the melting temperature of the metal particles of the particulate build material to about 500° C. below the melting temperature of the metal particles of the particulate build material. In yet other examples, a heat-fusing temperature can range from about 500° C. below the melting temperature of the metal particles of the particulate build material to about 1,000° C. below the melting temperature of the metal particles of the particulate build material.

A heat-fusing temperature can also depend upon the particle size and period of time that heating occurs, e.g., at a high temperature for a sufficient time to cause particle surfaces to become physically merged or composited together. For example, a heat-fusing temperature for stainless steel can be about 1400° C. and an example of a heat-fusing temperature for aluminum or aluminum alloys can range from about 550° C. to about 620° C. In one example, a heat-fusing temperature can range from about 400° C. to about 3,500° C. In another example, a temperature can range from about 600° C. to about 1,500° C., or from about 800° C. to about 1200° C. The heat-fusing temperature can fuse particles of the particulate build material to one another thereby forming a heat-fused three-dimensional object.

In some examples, the heat source can be configured to include a controlled atmosphere. For example, the controlled atmosphere can include an inert atmosphere of a noble gas, an inert gas, a reactive gas, or a combination thereof. In another example, the heat source can be associated with a vacuum. The vacuum can be configured to alter a pressure inside the heat source. In yet other examples, the heat source can maintain ambient conditions.

In further examples, the method can include removing the hardened supportive coating from a heat-fused three-dimensional object. The hardened supportive coating can be removed by sand-blasting, water-blasting, dry-ice blasting, ice-blasting, vacuuming, ultra-sonicating, brushing, or a combination thereof. In one example, the hardened supportive coating can be removed by sand-blasting and brushing the hardened supportive coating off a heat-fused three-dimensional object.

Three-Dimensional Printing System

A three-dimensional printing system 400 is illustrated by way of example in FIG. 4. The three-dimensional printing system can include a particulate build material 110, a binding agent applicator 420, a binding agent 120, a supportive coating agent 130, and a heat source 430. The particulate build material can include from about 80 wt % to about 100 wt % metal particles 112 based on the total weight of the particulate build material. The binding agent applicator can be fluidly coupled or coupleable to the binding agent to iteratively apply the binding agent to the particulate build material to form individually patterned object layers of a green body object. The supportive coating agent can include ceramic particles 132 having a negative coefficient of thermal expansion, e.g., metal oxide particles, non-oxide particles, etc., a gelling compound 134, and a supportive coating liquid vehicle 136. The supportive coating agent can be formulated to apply as a coating to the green body object. The heat source can be operable to heat the green body object with the supportive coating agent thereon to a coating-hardening temperature to harden the supportive coating agent and form a supportive coating on the green body object.

The binding agent applicator can be any type of apparatus capable of selectively applying the binding agent. For example, the binding agent applicator can be a fluid ejector or digital fluid ejector, such as an inkjet printhead, e.g., a piezo-electric printhead, a thermal printhead, a continuous printhead, etc. The binding agent applicator could also be a sprayer, a dropper, or other similar structure for applying the binding agent to the particulate build material. In the example illustrated in FIG. 4, the binding agent applicator is shown on a carriage track 422 but could be supported by any of a number of structures. The binding agent applicator can be fluidly coupled or coupleable to the binding agent and directable to apply the binding agent to the particulate build material to form a layered green body object. Thus, in some examples, the application can be by jetting or ejecting from a digital fluid jet applicator, similar to an inkjet pen. In yet another example, the binding agent applicator can include a motor and can be operable to move back and forth over the particulate build material along a carriage track when positioned over or adjacent to a powder bed of a build platform.

Other aspects of the three-dimensional printing system can include a build platform to support the particulate build material. The build platform can be positioned to receive the binding agent from the binding agent applicator onto a layer of the particulate build material. The build platform can be configured to drop in height thus allowing for successive layers of particulate build material to be applied by a supply and/or spreader. The particulate build material can be layered in the build platform at a thickness that can range from about 5 µm to about 1 mm. In some examples, individual layers can have a relatively uniform thickness. In one example, a thickness of a layer of the particulate build material can range from about 10 µm to about 500 µm, or from about 30 µm to about 200 µm.

Particulate Build Materials

The particulate build material 110 that may be utilized in the method of three-dimensional (3D) printing or present in the three-dimensional printing kit or the three-dimensional printing system, as described herein, can include from about 80 wt % to 100 wt %, from about 90 wt % to 100 wt %, from about 95 wt % to 100 wt %, or from about 99 wt % to 100 wt % metal particles 112, based on a total weight of the particulate build material. In an example, the metal particles can be an elemental metal, such as elemental transition metals. Examples can include titanium, copper, cobalt, chromium, nickel, vanadium, tungsten, tungsten carbide, tantalum, molybdenum, gold, silver, etc. The metal particles can also be aluminum (which is not a transition metal), or can be an alloy of multiple metals or can include a metalloid(s). In some examples, the alloy can be steel or stainless steel. Even though steel includes carbon, it is still considered to be metal in accordance with examples of the present disclosure because of its metal-like properties. The metal particles can be an admixture of any of these materials. In one example, the metal particles can include aluminum, titanium, copper, cobalt, chromium, nickel, vanadium, tungsten, tungsten carbide, tantalum, molybdenum, gold, silver, aluminum, stainless steel, steel, alloys thereof, or an admixture thereof.

The metal particles can exhibit good flowability and can have a shape type that can be spherical, irregular spherical, rounded, semi-rounded, discoidal, angular, subangular, cubic, cylindrical, or any combination thereof, to name a few. In one example, the metal particles can include spherical particles, irregular spherical particles, rounded particles, or other particle shapes that have an aspect ratio from 1.5:1 to 1:1, from 1.2:1, to 1:1. In some examples, the shape of the metal particles can be uniform or substantially uniform, which can allow for relatively uniform melting or sintering of the particulates after the three-dimensional green part is formed and then heat fused in a sintering or annealing oven, for example.

The particle size distribution can also vary. In accordance with this, in one example, the metal particles can have a D50 particle size distribution value that can range from about 2 µm to about 150 µm, from about 5 µm to about 125 µm, or from about 50 µm to about 100 µm. In other examples, the metal particles can have a D10 particle size distribution value that can range from about 1 µm to about 125 µm, from about 1 µm to about 100 µm, or from about 2 µm to about 125 µm. In another example, the D90 particle size distribution value for the metal particles can range from about 2.5 µm to about 200 µm or from about 4 µm to about 150 µm. As used herein, particle size can refer to a value of the diameter of spherical particles or in particles that are not spherical can refer to the equivalent spherical diameter of that particle. The particle size can be in a Gaussian distribution or a Gaussian-like distribution (or normal or normal-like distribution). Gaussian-like distributions are distribution curves that can appear Gaussian in distribution curve shape, but which can be slightly skewed in one direction or the other (toward the smaller end or toward the larger end of the particle size distribution range). In these or other types of particle distributions, the particle size can be characterized in one way using the 50th percentile of the particle size, sometimes referred to as the "D50" particle size. For example, a D50 value of about 25 µm means that about 50% of the particles (by volume) have a particle size greater than about 25 µm and about 50% of the particles have a particle size less than about 25 µm. Whether the particle size distribution is Gaussian, Gaussian-like, or otherwise, the particle size distribution can be expressed in terms of D50 particle size, which may usually approximate average particle size, but may not be the same. In examples herein, the particle size ranges can be modified to "average particle size," providing sometimes slightly different size distribution ranges.

The metal particles can be produced using any manufacturing method. However, in one example, the metal particles can be manufactured by a gas atomization process. During gas atomization, a molten metal is atomized by inert gas jets into fine metal droplets that cool while falling in an atomizing tower. Gas atomization can allow for the formation of mostly spherical particles. In another example, the metal particles can be manufactured by a liquid atomization process.

Binding Agents

In further detail, regarding the binding agent 120 that may be utilized in the method of three-dimensional (3D) printing or present in the three-dimensional printing kit or the three-dimensional printing system, as described herein, the binding agent can include binder particles 122 and a binder liquid vehicle 124. The term "binder particles" can include any material used to physically bind separate metal particles together or facilitate adhesion to a surface of adjacent metal particles in order to prepare a green part or green body object in preparation for subsequent heat-fusing, e.g., sintering, annealing, melting, etc. During three-dimensional printing, a binding agent can be applied to the particulate build material on a layer by layer basis. The binder liquid vehicle of the binding agent can be capable of wetting a particulate build material and the binder particles can move into vacant spaces between metal particles of the particulate build material, for example.

The binding agent can provide binding to the particulate build material upon application, or in some instances, can be activated after application to provide binding. The binder particles can be activated or cured by heating the binder particles (which may be accomplished by heating an entire layer of the particulate build material on a portion of the binding agent which has been selectively applied). If the binder particles include a polymer binder, then this may occur at about the glass transition temperature of the polymer binder particles, for example. When activated or cured, the binder particles can form a network that can adhere or glue the metal particles of the particulate build material together, thus providing cohesiveness in forming and/or holding the shape of the green body object or a printed layer thereof.

Thus, in one example, the green body object can have the mechanical strength to withstand extraction from a powder bed for coating with the supportive coating agent and heat-fusing. Once the green body object is heat-fused, that object is then herein referred to as a "fused" three-dimensional article, part, or object. In some examples, the binder particles contained in the binding agent can undergo a pyrolysis or burnout process, at from about 250° C. to about 700° C., where the binder particles may be removed during sintering or annealing. This can occur where the thermal energy applied to a green body part or object removes inorganic or organic volatiles and/or other materials that may be present either by decomposition or by burning the binding agent.

The binder particles can be included, as mentioned, in a binder liquid vehicle for application to the particulate build material. For example, the binder particles can be present in the binding agent at from about 1 wt % to about 50 wt %, from about 2 wt % to about 30 wt %, from about 5 wt % to about 25 wt %, from about 10 wt % to about 20 wt %, from about 7.5 wt % to about 15 wt %, from about 15 wt % to about 30 wt %, from about 20 wt % to about 30 wt %, or from about 2 wt % to about 12 wt % in the binding agent.

In one example, the binder particles can include a copper nitrate binder. In another example, the binder particles can include polymer particles, such as latex polymer particles. The polymer particles can have an average particle size that can range from about 100 nm to about 1 µm. In other examples, the polymer particles can have an average particle size that can range from about 150 nm to about 300 nm, from about 200 nm to about 500 nm, or from about 250 nm to 750 nm.

In one example, the latex particles can include any of a number of copolymerized monomers, and may in some instances include a copolymerized surfactant, e.g., polyoxyethylene compound, polyoxyethylene alkylphenyl ether ammonium sulfate, sodium polyoxyethylene alkylether sulfuric ester, polyoxyethylene styrenated phenyl ether ammonium sulfate, etc. The copolymerized monomers can be from monomers, such as styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

With respect to the binder liquid vehicle, binding agent can include from about 50 wt % to about 99 wt %, from about 70 wt % to about 98 wt %, from about 80 wt % to about 98 wt %, from about 60 wt % to about 95 wt %, or from about 70 wt % to about 95 wt % binder liquid vehicle, based on the weight of the binding agent as a whole. In one example, the binder liquid vehicle can include water as a major solvent, e.g., the solvent present at the highest concentration when compared to other co-solvents. In another example, the binder liquid vehicle can further include from about 0.1 wt % to about 70 wt %, from about 0.1 wt % to about 50 wt %, or from about 1 wt % to about 30 wt % of liquid components other than water. The other liquid components can include organic co-solvent, surfactant, additive that inhibits growth of harmful microorganisms, viscosity modifier, pH adjuster, sequestering agent, preservatives, etc.

When present, organic co-solvent(s) can include high-boiling solvents and/or humectants, e.g., aliphatic alcohols, aromatic alcohols, alkyl diols, glycol ethers, polyglycol ethers, 2-pyrrolidinones, caprolactams, formamides, acetamides, C6 to C24 aliphatic alcohols, e.g., fatty alcohols of medium (C6-C12) to long (C13-C24) chain length, or mixtures thereof. The organic co-solvent(s) in aggregate can be present from 0 wt % to about 50 wt % in the binding agent. In other examples, organic co-solvents can be present at from about 5 wt % to about 25 wt %, from about 2 wt % to about 20 wt %, or from about 10 wt % to about 30 wt % in the binding agent.

Supportive Coating Agents

The supportive coating agent can be coated on a green body object and hardened to form a supportive coating or a shell for the green body object prior to fusing of particles of the particulate build material. The supportive coating agent can therefore counteract deformation of the green body object that can occur during heat-fusing that may occur in-between burn-off of the binding agent and fusing of the particles of the particulate build material. For example, the supportive coating agent can form a structure that can prevent bending, warping, curling, or sagging of a green body object during heat fusing.

The supportive coating agent that may be utilized as described herein can include ceramic particles having a negative coefficient of thermal expansion, a gelling compound, and a supportive coating liquid vehicle 136, e.g., water, alcohol, water and alcohol, etc. In some examples, the supportive coating agent can be prepared by dispersing the ceramic particles in a gel that can include the supportive coating liquid vehicle and a gelling compound.

In an example, the ceramic particles can have a negative coefficient of thermal expansion. A negative coefficient of thermal expansion can allow a supportive coating to shrink in size during heat-fusing and thereby allow the supportive coating to shrink along with the green body object. The ceramic particles can have a negative coefficient of thermal expansion. The ceramic particles can be metal oxide ceramic particles, nonoxide-ceramic particles, etc. For example, the ceramic particles can include zirconium tungstate, titanium carbide, silicon nitride, silicon carbide, boron nitride, kaolin silicate, eucryptite ($LiAlSiO_4$), cordierite ($Mg_2Al_4Si_5O_{18}$), cyanide, cadmium cyanamide ($CdCN_2$), or a combination thereof. In one example, the ceramic particles can include zirconium tungstate. The ceramic particles can be present in the supportive coating agent at from about 10 wt % to about 50 wt %. In yet other examples, the ceramic particles can be present in the supportive coating agent at from about 15 wt % to about 30 wt %, at from about 20 wt % to about 40 wt %, or from about 30 wt % to about 50 wt %.

The ceramic particles can have a D50 particle size from about 0.5 µm to about 150 µm, from about 0.5 µm to about 100 µm, from about 1 µm to about 100 µm, or from about 2

μm to about 150 μm. In other examples, the ceramic particles can have a D10 particle size distribution value that can range from about 0.1 μm to about 100 μm, from about 1 μm to about 50 μm, or from about 20 μm to about 100 μm. In another example, the D90 particle size distribution value of the ceramic particles can range from about 2 μm to about 200 μm or from about 5 μm to about 150 μm.

In further detail, the gelling compound can be an inorganic gelling compound including a silicate. For example, the gelling compound can be selected from sodium metasilicate, potassium metasilicate, sodium orthosilicate, sodium pyrosilicate, organo orthosilicate, tetraethyl orthosilicate, or a combination thereof. In one example, the gelling compound can include sodium metasilicate.

In one example, the ceramic particles can include zirconium tungstate and the gelling compound can include sodium metasilicate. The zirconium tungstate can be in the form of particles dispersed in a gel formed from the sodium metasilicate and the supportive coating liquid vehicle. A weight ratio of the ceramic particles to the gelling compound can range from about 1:1 to about 1:9, from about 1:1 to about 1:5, or from about 1:2 to about 1:7.

The supportive coating liquid vehicle can be similar to that used for the binder liquid vehicle. In one example, however, the supportive liquid vehicle can be water. In another example, the supportive coating liquid vehicle can be alcohol, such as methanol, ethanol, isopropanol, n-propanol, etc. In another example, the supportive coating liquid vehicle can include both water and alcohol. In still other examples, the supportive coating liquid vehicle can further include organic co-solvent (other than or in addition to the alcohol), surfactant, biocide, and/or other liquid vehicle components as may be applicable for a given formulation.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the term "green" is used to describe any of a number of intermediate structures prior to particle to particle material fusing, e.g., green body article, green body object, green body layer, etc. As a "green" structure, the particulate build material can be (weakly) bound together by a binding agent. Typically, a mechanical strength of the green body is such that the green body can be handled or extracted from a particulate build material on a build platform to place in a sintering oven, for example. It is to be understood that any particulate build material that is not patterned with the binding agent is not considered to be part of the "green" structure, even if the particulate build material is adjacent to or surrounds the green body object or layer thereof. For example, unprinted particulate build material can act to support the green body object while contained therein, but the particulate build material is not part of the green structure unless the particulate build material is printed with a binding agent or some other fluid that is used to generate a solidified part prior to fusing, e.g., sintering, annealing, melting, etc.

As used herein, "kit" can be synonymous with and understood to include a plurality of compositions including multiple components where the different compositions can be separately contained (though in some instances co-packaged in separate containers) prior to use, but these components can be combined together during use, such as the three-dimensional object build processes described herein. The containers can be any type of a vessel, box, or receptacle made of any material.

As used herein, "applying" when referring to a binding agent that may be used, for example, refers to any technology that can be used to put or place the fluid agent, e.g., binding agent, on the particulate build material or into a layer of particulate build material for forming a green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters, up to about 30 picoliters, or up to about 50 picoliters, etc. Example ranges may include from about 2 picoliters to about 50 picoliters, or from about 3 picoliters to about 12 picoliters.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

The following illustrates an example of the present disclosure. However, it is to be understood that the following is only illustrative of the application of the principles of the present disclosure. Numerous modifications and alternative compositions, methods, and systems may be devised without departing from the present disclosure. The appended claims are intended to cover such modifications and arrangements.

Example

Two three-dimensional objects (Control Object and Object A) were prepared using a layer-by-layer powder bed printing process. All of the particulate build materials selected for use included 99 wt % copper particles with a 50

μm average particle size. The binding agent included a copper nitrate binder. The build process for the objects was as follows:

1) Particulate build material was spread evenly on a build platform at an average thickness of about 70 μm to form a build material layer.
2) Binding agent including binder particles was selectively applied to portions of the build material layer.
3) The spreading of the particulate build material (1) and the application of the binding agent (2) was then repeated until a green body object was formed having multiple layers.
4) The powder bed was heated to a temperature ranging from about 70° C. to about 100° C. for about 1 hour to drive off a portion of the solvent in the binding agent.
5) The green body objects formed had a staple-like shape with a support beam having a 28 mm length, which were removed from the particulate build material.
6) A "Control Object" was set aside for heat-fusing without a supportive coating applied thereto.
7) A supportive coating agent was prepared in accordance with the following general procedures:
a. About 1,600 to about 3,500 mg sodium metasilicate is admixed in about 300 to 450 mL of distilled water over a hotplate.
b. After a murky white viscous gel is formed, the admixture is removed from the hotplate and about 3,000 mg to 15,000 mg of zirconium tungstate (which has a negative coefficient of thermal expansion) is then added thereto.
8) "Object A" (one of the green body objects prepared) was dip coated with a supportive coating agent prior to heat-fusing. Object A was then submerged in the supportive coating agent and quickly removed therefrom. Object A with the supportive coating thereon was then slowly heated to about 100° C. to evaporate water from the supportive coating and to solidify the coating on Object A.
9) The Control Object and the Object A (with the solidified supportive coating) were heat-fused in a sintering oven. The sintering cycle included raising an interior temperature of the oven at from 2.5 to 5° C. per minute up to a target sintering temperature of 1040° C., with a few 1-2 hour temperature holds along the way at various temperature levels, e.g., 300° C. Once the temperature reached 1040° C., the temperature was held there for 4 hours. The sintering cycle degraded and removed binding agent and sintered the copper particles to one another.
10) Both objects were allowed to cool.
11) Object A which included the supportive coating applied thereto was sandblasted and brushed to remove remaining supportive coating agent residue.

In comparison, Control Object deformed during the heat-fusing process. The "staple" configuration of the three-dimensional object formed included a downward arc along the support beam crossbar that was not present when the green-body object was placed in the fusing oven. On the other hand, Object A maintained the support beam crossbar horizontal shape during heat fusing that was present with the original green-body object. Thus, the supportive coating agent applied to a surface of the green body object prevented deformation of the object through the sintering process.

What is claimed is:

1. A three-dimensional printing kit, comprising:
a particulate build material including from about 80 wt % to about 100 wt % of metal particles based on the total weight of the particulate build material;
a binding agent including binder particles dispersed in a binder liquid vehicle; and
a supportive coating agent including:
ceramic particles having a negative coefficient of thermal expansion;
a gelling compound selected from the group consisting of sodium metasilicate, potassium metasilicate, sodium orthosilicate, sodium pyrosilicate, organo orthosilicate, tetraethyl orthosilicate, and a combination thereof; and
a supportive coating liquid vehicle,
wherein a weight ratio of the ceramic particles to the gelling compound ranges from about 1:1 to about 1:9.

2. The three-dimensional printing kit of claim 1, wherein the metal particles are selected from the group consisting of aluminum particles, titanium particles, copper particles, cobalt particles, chromium particles, nickel particles, vanadium particles, tungsten particles, tungsten carbide particles, tantalum particles, molybdenum particles, magnesium particles, gold particles, silver particles, stainless steel particles, steel particles, and an admixture thereof.

3. The three-dimensional printing kit of claim 1, wherein the metal particles have a D50 particle size distribution value of from about 2 μm to about 150 μm.

4. The three-dimensional printing kit of claim 1, wherein the ceramic particles are selected from the group consisting of zirconium tungstate particles, titanium carbide particles, silicon nitride particles, silicon carbide particles, boron nitride particles, kaolin silicate particles, eucryptite particles, cordierite particles, cyanide particles, calcium cyanamide particles, and a combination thereof.

5. The three-dimensional printing kit of claim 1, wherein the ceramic particles are zirconium tungstate particles and the gelling compound is the sodium metasilicate, and wherein the zirconium tungstate particles are dispersed in a gel formed from the sodium metasilicate and the supportive coating liquid vehicle.

6. The three-dimensional printing kit of claim 1, wherein the weight ratio of the ceramic particles to the gelling compound ranges from about 1:2 to about 1:7.

7. The three-dimensional printing kit of claim 1, wherein the gelling compound is selected from the group consisting of potassium metasilicate, sodium orthosilicate, sodium pyrosilicate, organo orthosilicate, and a combination thereof.

8. A three-dimensional printing system utilizing the three-dimensional printing kit of claim 1, the system comprising:
a binding agent applicator fluidly coupled or coupleable to the binding agent to iteratively apply the binding agent to the particulate build material to form individually patterned object layers of a green body object; and
a heat source to heat the green body object with the supportive coating agent thereon to a coating-hardening temperature to harden the supportive coating agent and form a supportive coating on the green body object.

9. The three-dimensional printing system of claim 8, wherein:
the system further comprises a sintering oven to receive and heat the green body object with the supportive coating thereon to a metal particle-fusing temperature to form a heat-fused three-dimensional object; or the heat source is a sintering oven to heat the green body object with the supportive coating thereon to a metal particle-fusing temperature that is higher than the coating-hardening temperature to thereby heat the green body object sufficient to form a heat-fused three-dimensional object.

10. A method of three-dimensional printing, the method comprising:

iteratively applying individual build material layers of a particulate build material which includes from about 80 wt % to about 100 wt % of metal particles based on the total weight of the particulate build material;

based on a three-dimensional object model, iteratively applying a binding agent to individual build material layers to define individually patterned object layers that become adhered to one another to form a green body object, the binding agent including binder particles dispersed in a binder liquid vehicle;

coating the green body object with a supportive coating agent, the supportive coating agent including:
 ceramic particles having a negative coefficient of thermal expansion;
 a gelling compound selected from the group consisting of sodium metasilicate, potassium metasilicate, sodium orthosilicate, sodium pyrosilicate, organo orthosilicate, tetraethyl orthosilicate, and a combination thereof; and
 a supportive coating liquid vehicle,
 wherein a weight ratio of the ceramic particles to the gelling compound ranges from about 1:1 to about 1:9;

heating the green body object to a coating-hardening temperature to harden the supportive coating agent thereon and form a supportive coating on the green body object; and heating the green body object to a metal particle-fusing temperature that is higher than the coating-hardening temperature to form a heat-fused three-dimensional object.

11. The method of claim 10, further comprising removing the supportive coating from the heat-fused three-dimensional object.

12. The method of claim 11, wherein the removing of the supportive coating includes sand-blasting, water-blasting, dry-ice blasting, ice-blasting, vacuuming, ultra-sonicating, brushing, or a combination thereof.

13. The method of claim 10, wherein the method further includes preparing the supportive coating agent by dispersing the ceramic particles in a gel of the supportive coating liquid vehicle and the gelling compound.

14. The method of claim 10, wherein the coating of the green body object includes applying the coating at a thickness ranging from about 0.2 mm to about 2 mm.

15. The method of claim 10, wherein the heating of the green body object to the coating-hardening temperature to harden the supportive coating agent is at a temperature from about 100° C. to about 200° C., and wherein the heating of the green body object to the metal particle-fusing temperature that is higher than the coating-hardening temperature is at a temperature from about 10° C. to about 1,050° C. below a melting temperature of the metal particles of the particulate build material for a time period of from about a half hour to about twenty-four hours.

* * * * *